United States Patent
Janisch (10) Patent No.: US 10,132,649 B2
(45) Date of Patent: Nov. 20, 2018

(54) APPARATUS AND METHOD FOR THE REDUNDANT, ABSOLUTE POSITION DETERMINATION OF A MOVABLE BODY

(71) Applicant: Zentrum Mikroelektronik Dresden AG, Dresden (DE)

(72) Inventor: Josef Janisch, Österreich (AT)

(73) Assignee: IDT Europe GmbH, Dresden (DE)

( * ) Notice: Subject to any disclaimer, the term of this patent is extended or adjusted under 35 U.S.C. 154(b) by 283 days.

(21) Appl. No.: 14/381,992

(22) PCT Filed: Feb. 28, 2013

(86) PCT No.: PCT/EP2013/054102
§ 371 (c)(1),
(2) Date: Aug. 29, 2014

(87) PCT Pub. No.: WO2013/127962
PCT Pub. Date: Sep. 6, 2013

(65) Prior Publication Data
US 2015/0008907 A1 Jan. 8, 2015

(30) Foreign Application Priority Data

Feb. 29, 2012 (DE) .................. 10 2012 203 149
Feb. 29, 2012 (DE) .................. 10 2012 203 153
Feb. 29, 2012 (DE) .................. 10 2012 203 158

(51) Int. Cl.
*G01D 5/14* (2006.01)
*G01D 5/16* (2006.01)
*G01D 3/08* (2006.01)

(52) U.S. Cl.
CPC ............... *G01D 5/145* (2013.01); *G01D 3/08* (2013.01)

(58) Field of Classification Search
CPC .......... G01D 5/145; G01D 5/14; G01D 5/142; G01D 5/147; G01D 5/16; G01D 5/245;
(Continued)

(56) References Cited

U.S. PATENT DOCUMENTS 5,677,686 A  10/1997 Kachi et al.
6,087,831 A * 7/2000 Bornert ............... G01R 33/285
                                                              324/307
(Continued)

FOREIGN PATENT DOCUMENTS

AT         510377 A1      3/2012
CN      101257274 A       9/2008
(Continued)

OTHER PUBLICATIONS

International Search Report for application No. PCT/EP2013/054102, dated Aug. 12, 2013, 3 pages—translated.
(Continued)

*Primary Examiner* — Huy Q Phan
*Assistant Examiner* — David Frederiksen
(74) *Attorney, Agent, or Firm* — Reising Ethington P.C.

(57) ABSTRACT

The invention relates to an apparatus for contactlessly detecting the absolute position of an element which can move relative to magnetosensitive sensors and has a magnetic field source fastened on the movable element, wherein two magnetosensitive sensors in a plane which are spatially offset in the direction of movement are arranged at a distance from the magnetic field source. Provision is made for the apparatus to be redundant such that said apparatus has two sensor elements, wherein two such magnetosensitive sensors are arranged in each sensor element.

18 Claims, 10 Drawing Sheets

(58) Field of Classification Search
CPC ............. G01D 5/2451; G01D 5/24471; G01D 5/24476; G01D 5/2448; G01R 33/06; G01R 33/07; G01R 33/09; G01B 7/30; H05K 13/0413
See application file for complete search history.

(56) References Cited

U.S. PATENT DOCUMENTS

| | | | |
|---|---|---|---|
| 6,263,230 B1* | 7/2001 | Haynor | A61B 5/062 128/899 |
| 6,433,536 B1* | 8/2002 | Yundt | G01D 5/145 324/207.2 |
| 7,495,432 B2 | 2/2009 | Kato et al. | |
| 8,125,216 B2 | 2/2012 | Thomas et al. | |
| 9,136,750 B2* | 9/2015 | Mizumaki | H02K 11/215 |
| 2002/0171418 A1 | 11/2002 | Hinz et al. | |
| 2003/0218458 A1* | 11/2003 | Seger | G01D 5/142 324/303 |
| 2004/0140793 A1* | 7/2004 | Rodi | G01D 5/2448 324/76.77 |
| 2005/0127900 A1* | 6/2005 | Johnson | G01D 5/145 324/207.2 |
| 2006/0208726 A1* | 9/2006 | Mock | G01D 5/145 324/207.24 |
| 2007/0080682 A1* | 4/2007 | Govari | A61B 5/06 324/247 |
| 2008/0012558 A1* | 1/2008 | Rossler | B82Y 25/00 324/252 |
| 2008/0203961 A1 | 8/2008 | Yasuda | |
| 2009/0000413 A1* | 1/2009 | Furhoff | B60K 37/06 74/473.3 |
| 2009/0012460 A1 | 1/2009 | Steck et al. | |
| 2009/0206827 A1* | 8/2009 | Aimuta | G01D 5/145 324/207.25 |
| 2009/0267594 A1* | 10/2009 | Kather | G01B 7/30 324/207.25 |

FOREIGN PATENT DOCUMENTS

| | | | |
|---|---|---|---|
| DE | 3413855 A1 | 10/1985 | |
| DE | 19817356 A1 | 10/1999 | |
| DE | 10060287 A1 | 6/2001 | |
| DE | 10360042 A1 | 7/2005 | |
| DE | 112008003576 T5 | 1/2011 | |
| DE | 102010027166 A1 | 1/2012 | |
| EP | 0877488 A1 | 11/1998 | |
| EP | 1798523 A1 * | 6/2007 | ............. G01D 5/145 |
| EP | 2233889 A1 | 9/2010 | |
| EP | 2284495 A2 | 2/2011 | |
| JP | H07218288 A | 8/1995 | |
| JP | 2003149001 A | 5/2003 | |
| JP | 2008292466 A | 12/2008 | |
| JP | 2011508891 A | 3/2011 | |

OTHER PUBLICATIONS

International Search Report and Written Opinion for application No. PCT/EP2013/054102, dated Aug. 12, 2013, 11 pages—not translated.

Korean Office Action in Korean with English translation corresponding to KR application No. 10-2014-7027445, dated Jun. 7, 2016, 22 pages.

* cited by examiner

APPARATUS AND METHOD FOR THE REDUNDANT, ABSOLUTE POSITION DETERMINATION OF A MOVABLE BODY

TECHNICAL FIELD

The invention relates to an apparatus and a method for the redundant, absolute position determination of a movable body. The invention relates, in particular, to an apparatus and a method for absolute, redundant position determination for off-axis and on-axis applications by means of magneto sensitive sensors.

BACKGROUND

WO 2007/071 383 relates to an apparatus for contactless, redundant position determination, in which two integrated magnetic angle sensor circuits constructed on a Hall sensor basis are placed above one another in a common housing, the two circuits being separated from one another by means of an insulating intermediate layer.

In the case of these angle sensors, a structure in which the axis of rotation of the rotating magnet comes to rest centrally above the center of the integrated Hall sensor group arranged in a circular manner on the circuit is essential. A lateral offset of the sensor elements relative to the axis of rotation results in an increase in the angle error, in particular if the Hall sensors are situated outside the vertical magnetic field Bz running in an approximately linear manner between the poles of the magnetic field source.

For this reason, it is therefore not useful to position the circuits beside one another in a common housing. In order to center both angle sensors relative to the axis of rotation of the magnetic field source, they must therefore be installed above one another in the common housing.

The disadvantage of this structure is the greater amount of effort caused by mounting the circuits above one another with an additional insulation layer in between.

Another disadvantage is that the tolerance range for the vertical distance between the magnet and the sensor housing is greatly restricted by the structure of the angle sensors lying above one another since both the angle sensor lying at the bottom and the angle sensor lying at the top must be within a tolerance window for the optimum operating range of the strength of the magnetic field. Furthermore, this structure is suitable only for an axial structure where the angle sensor circuit is below the magnetic field source in a manner normal and central to the axis of rotation.

In safety-critical applications, for example a drive motor for an electronic steering system EPS, forces may act on the drive shaft to be measured in the event of load changes, for example, which forces displace the drive shaft in the axial direction. As a result of the axial structure, this displacement changes the distance between the magnetic field source, which is fitted at the end of the drive shaft, and the sensor. In order to avoid possible damage to the sensor or magnet caused by mechanical contact between the two objects, a minimum distance between the magnetic field source and the sensor housing must be complied with, which in turn further restricts the tolerance range for the distance between the sensor and the magnetic field source.

SUMMARY

The invention is based on the object of specifying a redundant sensor system for contactlessly detecting the absolute position of an element which is movable relative to magnetosensitive sensors, the magnetosensitive sensors being able to be arranged in such a manner that their signals have a phase offset that is not equal to 90°.

The invention is based, in particular, on the object of providing a redundant sensor system for so-called off-axis applications, that is to say applications in which magnetosensitive sensors are situated outside the axis of symmetry of a movable body, which system is able to make it possible to redundantly detect the position of a rotatably mounted body using two separate sensor systems. Magnetosensitive sensors should be understood as meaning, in particular, Hall sensors.

This object is achieved with an apparatus according to the independent apparatus claim and a method according to the independent method claim. The dependent claims relate to special embodiments.

The invention relates to an apparatus for contactlessly detecting the absolute position of an element which is movable relative to magnetosensitive sensors and has a magnetic field source fastened on the movable element, two magnetosensitive sensors which are in one plane and are spatially offset in the direction of movement being arranged at a distance from the magnetic field source. Provision is made for the apparatus to have a redundant design such that it has two sensor elements, two such magnetosensitive sensors being arranged in each sensor element.

One refinement relates to an apparatus for so-called off-axis applications for determining an absolute rotational position of the movable element. In this case, provision is made for the movable element to be rotatably mounted, and for the plane to be arranged parallel to the axis of rotation. The two sensor elements are accommodated in a common housing which is fitted in a stationary manner to the side of the magnetic field source parallel to the axis of rotation, which sensor elements each comprise two magnetosensitive sensors, which are in one plane and are spatially offset in the direction of rotational movement, with the associated evaluation electronics and detect and evaluate the radial component of the magnetic field.

One refinement relates to an apparatus for so-called on-axis applications for determining an absolute rotational position of the movable element. In this case, provision is made for the movable element to be rotatably mounted, and for the plane to be arranged normal to the axis of rotation. The two sensor elements are accommodated in a common housing which is fitted in a stationary manner parallel to the plane, which sensor elements each comprise two magnetosensitive sensors, which are in one plane and are spatially offset in the direction of rotational movement, with the associated evaluation electronics and detect and evaluate the axial component of the magnetic field.

The magnetosensitive sensors are preferably arranged equidistantly and symmetrically around the axis of rotation in the common housing.

In this case, provision is made for the movable element to be rotatably mounted, and for the plane to be arranged normal to the axis of rotation. The two sensor elements are accommodated in a common housing which is fitted in a stationary manner to the side of the magnetic field source parallel to the axis of rotation, which sensor elements each comprise two magnetosensitive sensors, which are in one plane and are spatially offset in the direction of rotational movement, with the associated evaluation electronics and detect and evaluate the axial component of the magnetic field.

One refinement provides for the absolute rotational position to be detected over an angular range of 360°, the magnetic field source being in the form of a disk magnet or a ring magnet with two-pole diametric magnetization.

Another refinement provides for the absolute rotational position to be detected over an angular range of <360°, the magnetic field source being in the form of a disk magnet or a ring magnet with multi-pole magnetization.

One refinement relates to an apparatus for determining the absolute linear position of a translationally movable element. Provision is made for the movable element to be linearly displaceable, a magnetic field source which is in the form of a multi-pole magnetic strip and has poles of equal length being fastened on the movable element. In this case, the magnetosensitive sensors detect the component of the magnetic field normal to the direction of movement, in which case the distance between the two magnetosensitive sensors of a sensor element, the length of the magnet poles and the position of the magnetosensitive sensors relative to the magnetic field source should be selected in such a manner that the resulting phase offset of the sensor signals from each sensor element is not 180° and is not 360°.

One refinement of the apparatus for detecting the absolute linear position provides for two sensor elements to be accommodated in a common housing which is fitted in a stationary manner at a distance from the magnetic field source parallel to the direction of movement, which sensor elements each comprise two magnetosensitive sensors, which are in one plane and are spatially offset in the direction of movement, with the associated evaluation electronics and detect and evaluate a component of the magnetic field, the range which can be immediately measured in absolute terms corresponding to the length of a pole pair of the magnetic field source.

The magnetosensitive sensors can be integrated together on a sensor chip. The sensor elements themselves may also be integrated on a sensor chip.

The invention also relates to a method for determining the absolute position of an element which is movable relative to magnetosensitive sensors using an apparatus for contactlessly detecting an element which is movable relatively and has a magnetic field source fastened on the movable element, a first sensor element and a second sensor element being arranged at a distance from the magnetic field source, and two magnetosensitive sensors which are spatially offset in the direction of movement being arranged in each sensor element. Provision is made for a first sensor signal to be measured using the first magnetosensitive sensor of each sensor element and for a second sensor signal to be measured using the second magnetosensitive sensor of each sensor element, the first sensor signal and the second sensor signal representing a component of the magnetic field, and the sensor signals having a phase offset φ in the range of 0°<φ<180° or 180°<φ<360°, provision being made for amplitude ratios to be determined by dividing a predefinable signal swing by a difference between a maximum value and a minimum value of the respective sensor signals, for offset values around the respective zero point of the sensor signals to be determined from the minimum and maximum values of the sensor signals, for normalized sensor signals to be calculated by subtracting the offset values from the sensor signals and by means of normalization with the amplitude ratios, the minimum and maximum values being determined by means of a relative movement of the element and the magnetic field source fastened thereto over a complete movement path while simultaneously detecting the sensor signals from both sensors, for a sum signal and a difference signal to be formed from the normalized sensor signals, for the sum signal and the difference signal to in turn be normalized after determining the amplitude ratio, the minimum and maximum values being determined by means of a relative movement of the element and the magnetic field source fastened thereto over a complete movement path while simultaneously measuring the sum signal and the difference signal and evaluating the minimum and maximum values of the sum signal and of the difference signal, and for an absolute position of the magnetic field source to be calculated using the normalized sum signal and the normalized difference signal.

Provision is made for the absolute position for the sensor signals from each sensor element to be redundantly determined.

One refinement of the method provides for the movable element to be a rotatable element and for an absolute rotational position of the magnetic field source to be calculated by forming the arc tangent of the ratio of the normalized sum signal and the normalized difference signal.

One refinement of the method provides for the movable element to be a linearly displaceable element and for an absolute linear position to be determined.

The absolute position of the magnetic field source can be calculated using a coordinate transformation algorithm, preferably a CORDIC algorithm. This applies both to the absolute rotational position and to the absolute linear position. The different constellations are summarized in the following table.

|  | Rotational angle | Linear position |
| --- | --- | --- |
| Type of magnet | Two-pole or multi-pole disk | Multi-pole strip (n pole pairs) |
| Electrical output signal | 0° to <360° per pole pair | 0° to <360° per pole pair |
| Mechanical output signal | 360° divided by the number of pole pairs | 360° corresponds to the length of a pole pair |

As the magnet moves past the sensor, an angle of 0° to <360° is measured as soon as the magnet has run through one period=one pole pair (north pole and south pole) at the location of the sensor, in which case it is irrelevant whether the signal is produced by a rotational movement or a linear movement since a sinusoidal signal is measured in both cases at the location of the sensor.

This can therefore now be a full revolution (0°-<360°) in the case of a two-pole disk magnet for rotational angle measurement or half a revolution of 0°-180° in the case of a four-pole disk magnet for rotational angle measurement.

In a similar manner, a signal of 0°-<360° is likewise produced with a multi-pole magnetic strip if the strip is moved linearly over the length of a pole pair; in the case of a pole length of 2 mm for example, a pole pair has a length of 4 mm. A measurement result of 0° therefore corresponds to the position of 0 mm and a measurement result of <360° (359.99999 . . . °) corresponds to the length of 4 mm (=the length of a pole pair). The operation is then repeated. The absolute position can therefore be determined only within a pole pair. In order to determine an absolute position beyond the length of a pole pair, the number of pole pairs passed through must be counted:

In the above example, an indication of 180° would then correspond to a distance of 2 mm, 6 mm, 10 mm, 14 mm, etc.

The positions can only be distinguished by counting the pole pairs passed through starting from the position of 0 mm:

Indication=180°, 0 pole pairs passed through=distance covered=2 mm

Indication=180°, 1 pole pair passed through (4 mm)=distance covered=2 mm+4 mm=6 mm Indication=180°, 2 pole pairs passed through (2×4 mm)=distance covered=2 mm+8 mm=10 mm

BRIEF DESCRIPTION OF THE DRAWINGS

The invention is now explained further using embodiments and associated figures, in which.

DETAILED DESCRIPTION

Figure 1:
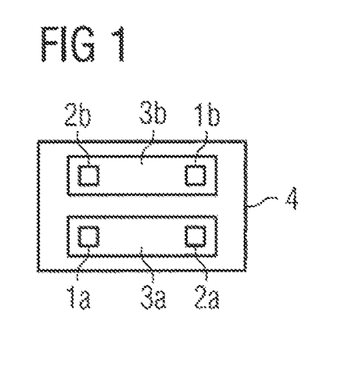
FIG. 1 shows the structure of two sensor elements in a vertical arrangement.

FIG. 1 shows the structure of the two sensor elements 3a, 3b in the common housing 4: the sensor elements 3a and 3b are identical and each contain two magnetosensitive sensors in the form of Hall sensors 1a, 2a and 1b, 2b. The signal processing electronics are also respectively additionally integrated on the sensor element. In this case, the two sensor elements 3a, 3b have been rotated through 180° with respect to one another. The resultant measurement results are opposed to one another and must be accordingly taken into account during evaluation in an external computing unit. This structure can simplify the electrical connection between the sensor element and the electrical connections of the housing if, for example, the electrical connections of the sensor element are only on a longitudinal side of the sensor element and then directly face the corresponding rows of contacts of the sensor housing.

Figure 2:
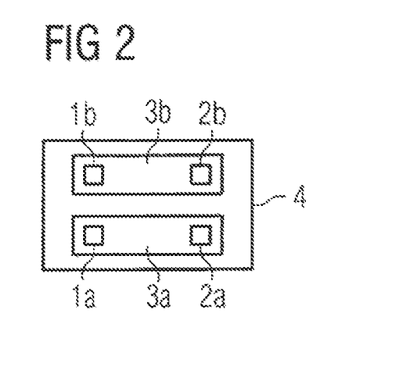
FIG. 2 shows the structure of two sensor elements in a parallel arrangement.

In FIG. 2, the two sensor elements are arranged parallel to one another. In this embodiment, the resultant measurement results are in line with one another.

Figure 3:
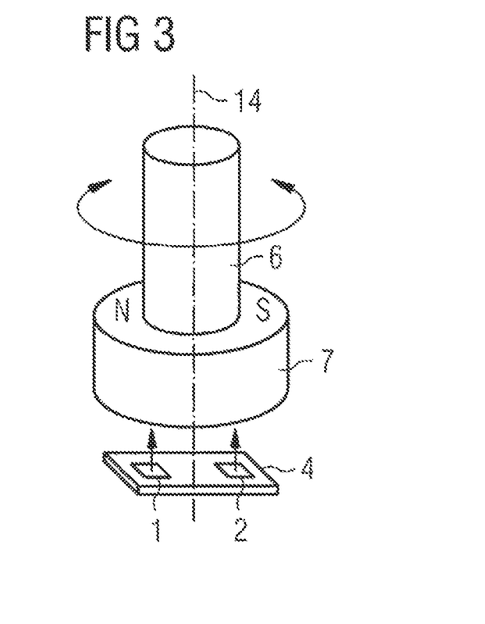
FIG. 3 shows a non-redundant arrangement for measuring a rotational position with an axial structure.

FIG. 3 shows a non-redundant arrangement in which the magnetosensitive sensors are below the magnetic field source. The axes of the Hall elements 1, 2 integrated on a common substrate 5, which axes are sensitive to the measurement of the magnetic field, are illustrated as arrows.

Figure 4:
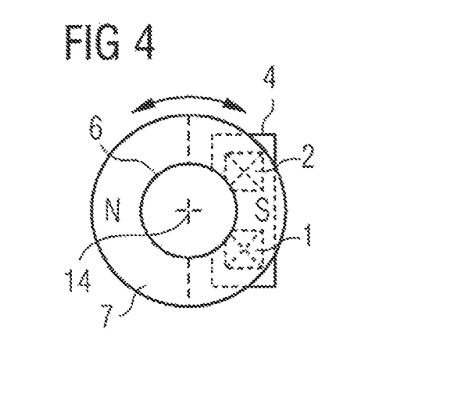
FIG. 4 shows a plan view of the arrangement shown in FIG. 3, FIG. 5-FIG. 8 show different embodiments of suitable magnetic field sources.

FIG. 4 shows a plan view of the arrangement described in FIG. 3.

Figure 5:
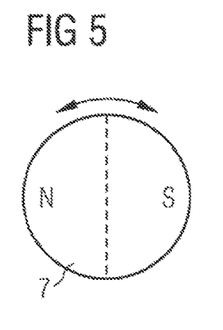
Figure 6:
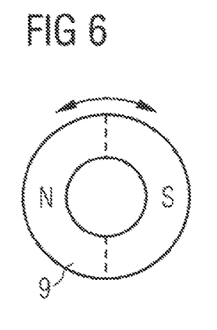

FIG. 5-FIG. 8 show different embodiments of suitable magnetic field sources:

FIG. 5 and FIG. 6 show a disk magnet 7 and a ring magnet 9 with two-pole diametric magnetization, which make it possible to determine the absolute rotational position over 360°.

Figure 7:
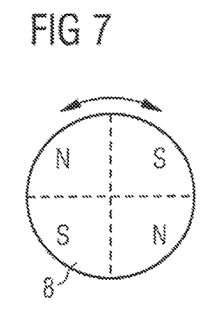
Figure 8:
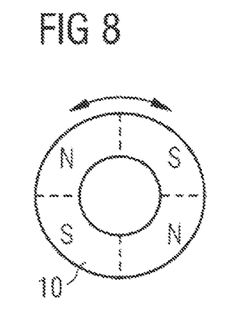
Figure 9:
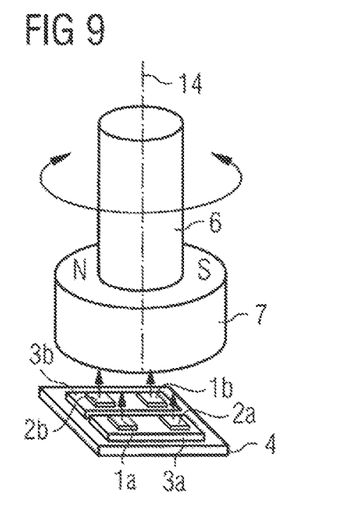
FIG. 9 shows an arrangement for redundantly measuring a rotational position with an axial structure.

FIG. 7 and FIG. 8 show a disk magnet 8 and a ring magnet 10 with multi-pole magnetization. The illustrations shown here show an embodiment with 4 poles, but the use of the invention is not limited to this number of poles but rather applies to any desired number of pole pairs. The maximum rotational position range which can be measured in absolute terms in these embodiments is 360°/pp, where pp corresponds to the number of pole pairs of the magnets. When using these magnetic field sources FIG. 9 shows an embodiment for redundantly measuring a rotational position with an axial structure. An object 6 which is rotatably mounted around an axis of rotation 14 contains a magnetic field source 7 which is connected to the object and the axial magnetic field Bz of which is measured and evaluated using two sensor systems 3a, 3b.

The axes of the integrated Hall sensors, which axes are sensitive to the measurement of the magnetic fields, are illustrated in the form of arrows.

Figure 10:
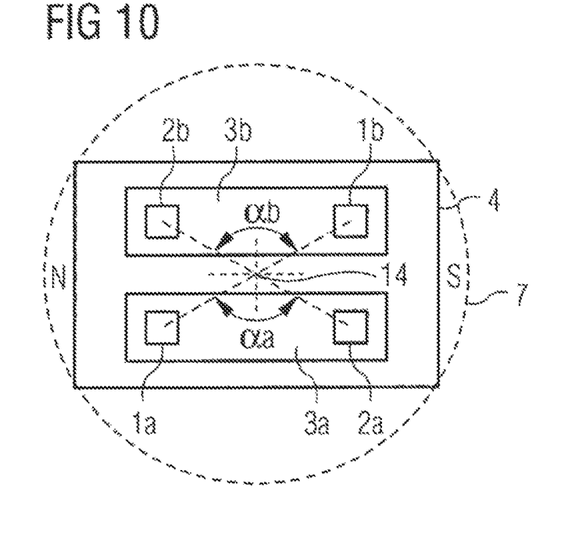
FIGS. 10-13 show plan views of different embodiments of the arrangement shown in FIG. 9.
Figure 11:
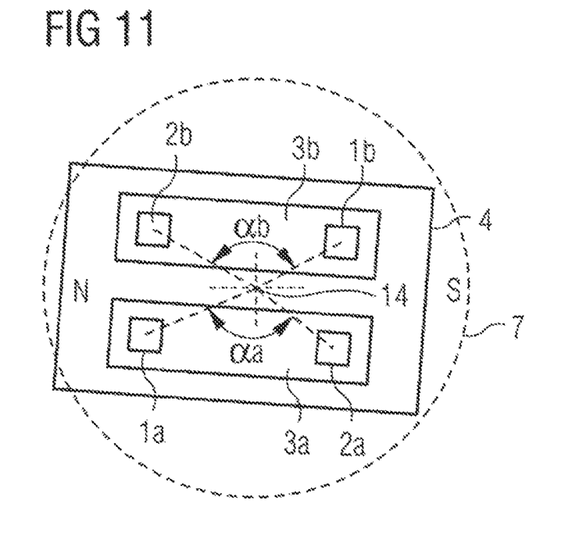
Figure 13:
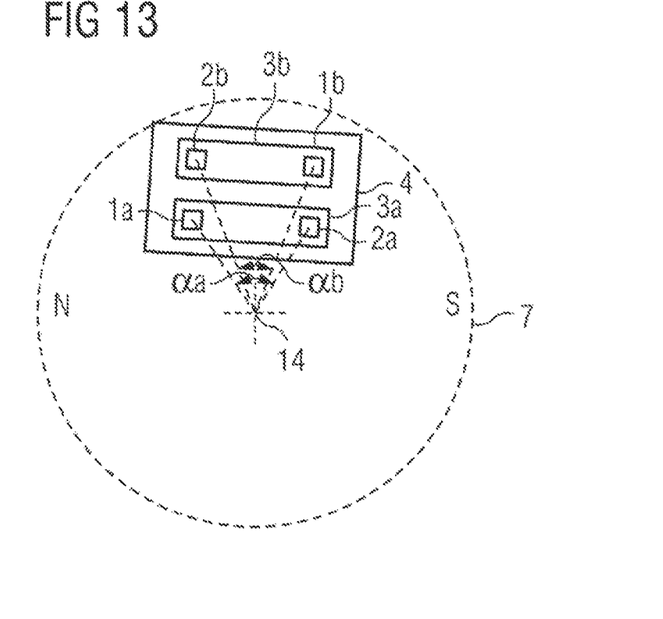

FIG. 10 shows a plan view of a structure according to the axial embodiment from FIG. 9. With this structure, it should be noted that the axis of rotation 14 must be outside the direct connection of the sensors 1a→2a and 1b→2b, and the angle of the sensors relative to the axis of rotation αa and αb is therefore not 180°. However, there is no need to accurately center the sensors relative to the axis of rotation (αa=αb) since these centering tolerances can be compensated for by a reference run after the sensor system has been assembled. FIG. 13 illustrates an example of such misalignment.

Figure 12:
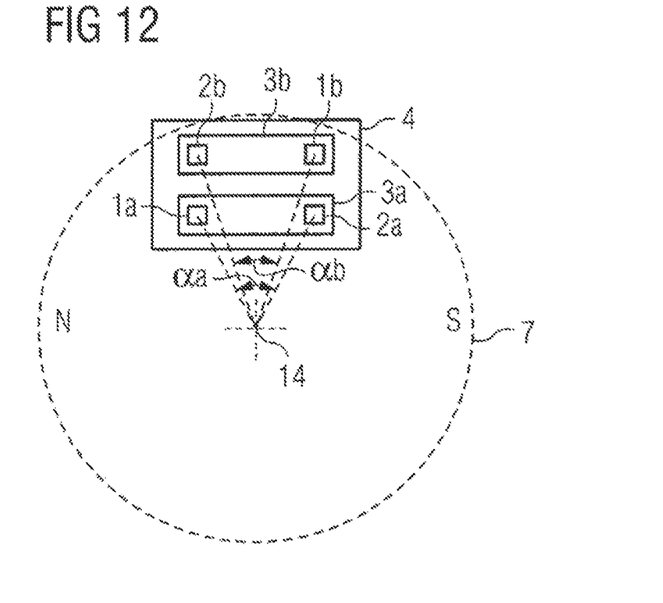

FIG. 12 shows an embodiment as can be used for larger magnet diameters or ring magnets. The sensor system is fitted eccentrically with respect to the axis of rotation 14. This structure likewise enables absolute rotational angle determination over 360°. The axial magnetic field Bz is reduced at different radii of the magnetic field source with the magnetosensitive sensors in the form of Hall sensors 1a and 2a and 1b and 2b, thus producing different angles αa≠αb relative to the axis of rotation and therefore also different phase angles of the sensor signals in both sensor systems 3a, 3b. However, these different phase angles can be detected and compensated for by a reference run after the sensor system has been assembled.

In FIG. 13, the sensors are tangentially offset relative to the axis of rotation and are rotated relative to their center. Such misalignment can likewise be compensated for by a reference run after the sensor system has been assembled.

The associated method is explained below.

Figure 14:
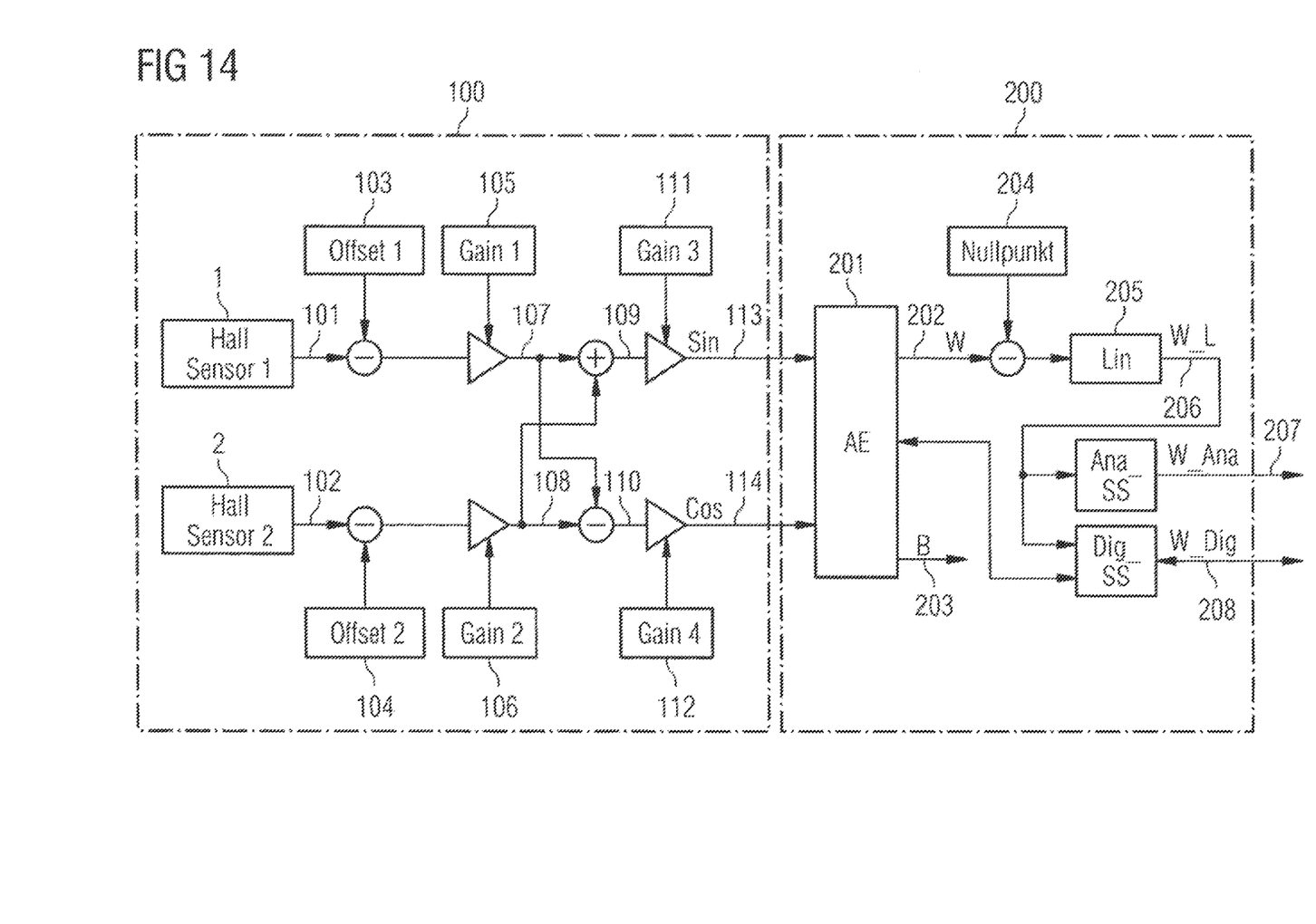
FIG. 14 shows an analog block diagram of the signal processing.

FIG. 14 illustrates the analog signal processing path in block 100 and the digital signal processing path in block 200.

Figure 16:
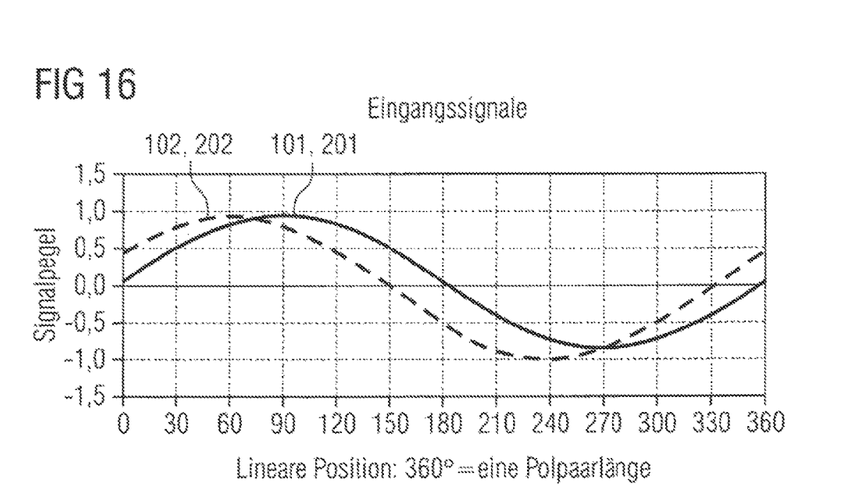
FIG. 16 to FIG. 20 show signal profiles.

In the exemplary embodiment shown in FIG. 16, it is assumed that the measured signals from the magnetosensitive sensors in the form of Hall sensors 1, 2 have a phase angle of 30°, have already been pre-amplified and are afflicted both with offset voltages and with different signal levels on account of positioning accuracy influences and on account of process tolerances.

Figure 17:
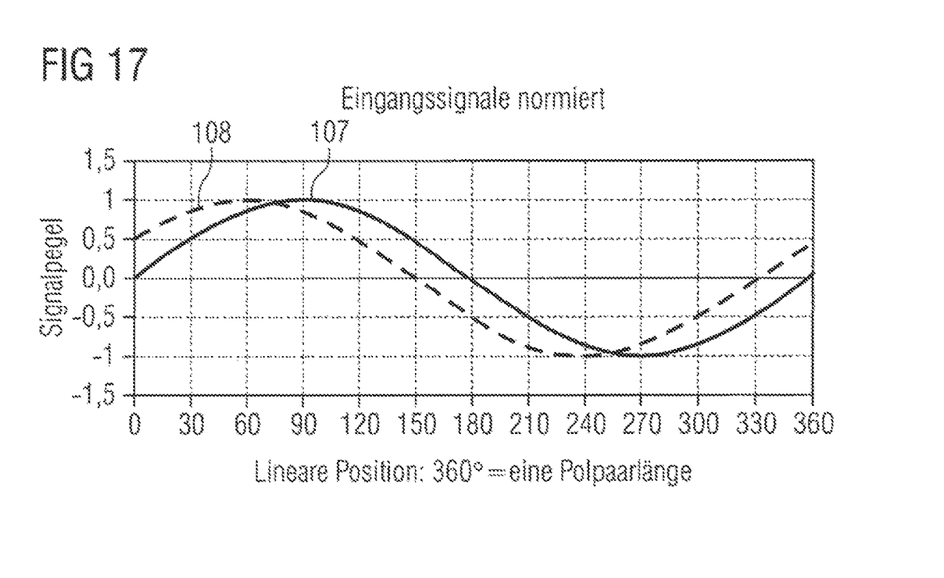

In a first step, the offset voltage of the sensor signals 101, 102 is subtracted and the signal levels are adjusted to a normalized signal swing (for example 2 $V_{ss}$). The normalized signal levels are available as signals 111 and 112 and are illustrated in FIG. 17.

In order to calculate the required trimming values for Offset1, Offset2, Gain1 and Gain2, it is sufficient to determine the minimum and maximum values of the sensor signals 101, 102. This can be effected by simply rotating the magnetic field source while simultaneously determining the minimum and maximum values of the sensor signals 101 and 102.

The values needed for trimming can then be calculated from the minimum and maximum values as follows:

$$\text{Offset1} = \frac{H1_{max} + H1_{min}}{2} \quad [1]$$

$$\text{Offset2} = \frac{H2_{max} + H2_{min}}{2} \quad [2]$$

$$\text{Gain1} = \frac{\text{normalized\_signalswing}}{H1_{max} - H1_{min}} \quad [3]$$

$$\text{Gain2} = \frac{\text{normalized\_signalswing}}{H2_{max} - H2_{min}} \quad [4]$$

$H1_{max,min}$=maximum and minimum value of sensor signal1 101

$H2_{max,min}$=maximum and minimum value of sensor signal2 102.

Figure 18:
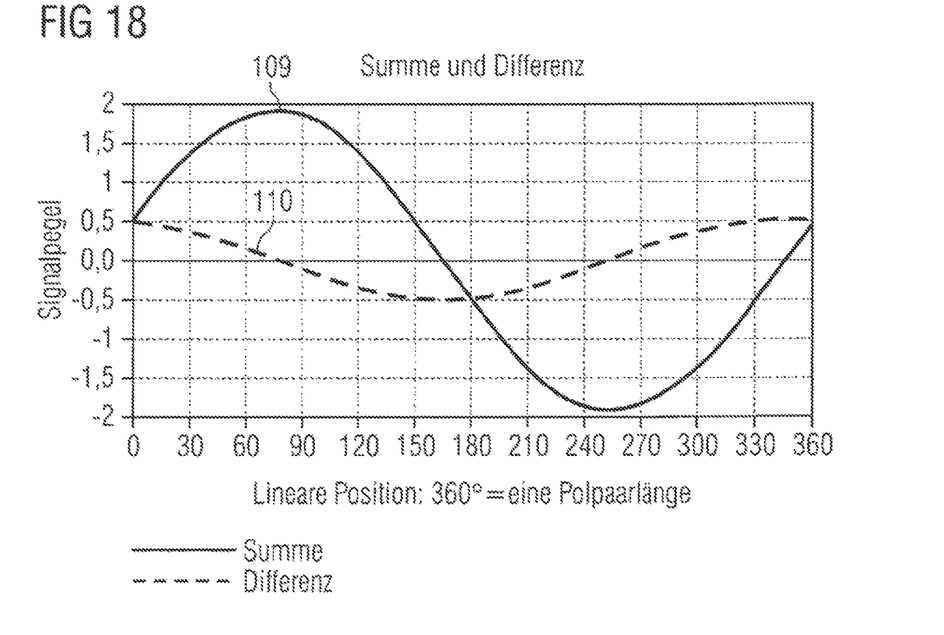

In the next step, the sum 109 and the difference 110 are formed from these normalized signals. FIG. 18 illustrates these signals.

The ratio of the signal swing of the sum signal to the difference signal depends on the phase angle φ of the input signals 101, 102. However, the phase angle φ of the sum signal to the difference signal is always 90°. An exception is the special cases of the phase angles φ=360°=0° and φ=180°, in the case of which it is not possible to determine the rotational position since the sum signal becomes 0 at φ=180° and the difference signal becomes 0 at φ=360°=0°.

Figure 20:
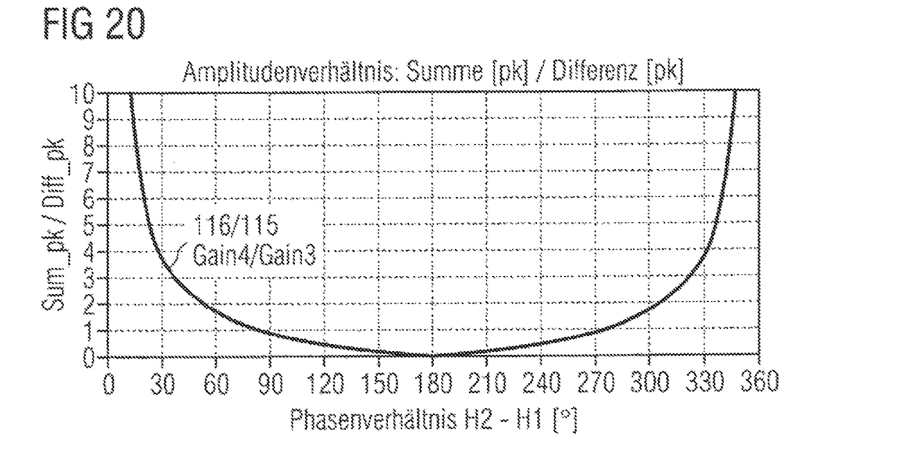

FIG. 20 illustrates this relationship in a graph. The X axis shows the phase relationship of the input signals 101, 102 and the Y axis shows the amplitude ratio of the peak values of the normalized sum signal to the normalized difference signal.

The mathematical relationship of the peak values of the sum signal divided by the $$\text{difference signal} = \frac{\hat{S}}{\hat{D}}$$

to the phase angle is calculated from:

$$\frac{\hat{S}}{\hat{D}} = \frac{1}{\tan\left(\frac{\varphi}{2}\right)} \text{ for } 0° < \varphi < 180° \quad [5]$$

$$\frac{\hat{S}}{\hat{D}} = \frac{-1}{\tan\left(\frac{\varphi}{2}\right)} \text{ for } 180° < \varphi < 360°. \quad [6]$$

Figure 19:
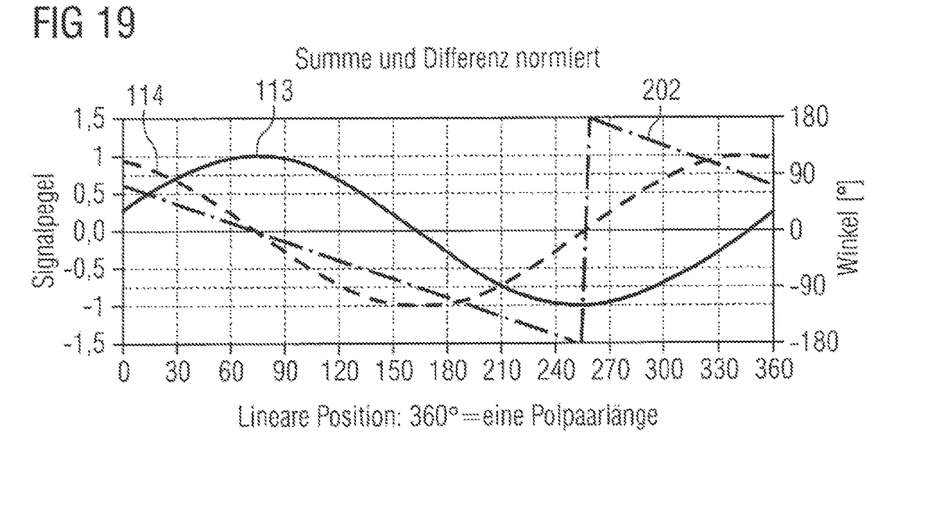

In a further step, the sum signal 109 and the difference signal 110 are in turn normalized to a predefined value, for example 2 $V_{ss}$, as illustrated in FIG. 19.

In order to calculate the required trimming values for Gain3 and Gain4, it is sufficient to determine the minimum and maximum values of the sum and difference signals.

This can be effected by simply rotating the magnetic field source 7, 8, 9, 10 (FIG. 4-FIG. 8) over one full period while simultaneously determining the minimum and maximum values of the sum and difference signals.

The values required for trimming can then be calculated from the minimum and maximum values as follows:

$$\text{Gain3} = \frac{\text{normalized\_signalswing}}{\text{sum signal}_{max} - \text{sum signal}_{min}} \quad [7]$$

$$\text{Gain4} = \frac{\text{normalized\_signalswing}}{\text{difference signal}_{max} - \text{difference signal}_{min}} \quad [8]$$

If it is assumed that the normalized sensor signals 107, 108 correspond to a pure sinusoidal waveform and no longer have an offset voltage, no additional offset is likewise produced by forming the sum and difference. This can be checked and possibly also corrected using the minimum and maximum values of the sum and difference signals:

$$\text{Offset}_{sum\ signal} = \frac{\text{sum signal}_{max} + \text{sum signal}_{min}}{2} \quad [9]$$

$$\text{Offset}_{difference\ signal} = \frac{\text{difference signal}_{max} + \text{difference signal}_{min}}{2} \quad [10]$$

The normalized signals of the sum signal 113 and of the difference signal 114 therefore produce two signals which are phase-shifted through exactly 90° and have the same signal swing. These signals are then immediately used to calculate the position, see FIG. 19.

The normalized sum signal 113 is subsequently described by V sin and the normalized difference signal 114 is subsequently described by V cos.

$$V\sin=\text{Gain3}*[\text{Gain1}*(H1-\text{Offset1})+\text{Gain2}*(H2-\text{Offset2})] \quad [11]$$

$$V\cos=\text{Gain4}*[\text{Gain1}*(H1-\text{Offset1})-\text{Gain2}*(H2-\text{Offset2})] \quad [12]$$

H1=sensor signal from Hall sensor1 101
H2=sensor signal from Hall sensor2 102
Offset1=offset signal from Hall sensor1 103
Offset2=offset signal from Hall sensor2 104
Gain1=gain of the sensor signal H1 105
Gain2=gain of the sensor signal H2 106
Gain3=gain of the sum signal 111
Gain4=gain of the difference signal 112.

Starting from the signals V sin 113 and V cos 114, the absolute position W 202 of the magnetic field source can be determined with the aid of the arc tangent function $$W = \arctan\frac{V\sin}{V\cos} \quad [13]$$

or other suitable coordinate transformation means, for instance a digital CORDIC algorithm.

The magnitude value B 203 of the coordinate transformation is constant for all positions and is:

$$B=\sqrt{V\sin^2+V\cos^2}=\text{const.} \quad [14]$$

FIG. 19 shows the normalized sum signal 113=V sin and the normalized difference signal 114=V cos.

Furthermore, the absolute rotational position 202 calculated from V sin and V cos is illustrated on a second ordinate axis with a scaling of +/−180°.

In many applications, it may be useful to bring the calculated rotational position in line with a defined mechanical position of the movable element 6, for example the zero position of a rotary actuator. In order to facilitate this, any desired rotational position can be set to zero by subtracting a zero reference value 204.

Furthermore, the achieved accuracy of the indicated rotational position can optionally be increased by means of a linearization circuit 205. Conventional forms of linearization are tables or mathematical correction functions which attempt to adjust the calculated position to reference points defined by the user.

The calculated and linearized rotational position W_L can subsequently be provided to the user by conversion to an analog signal waveform 207 or a digital signal waveform 208.

Figure 15:
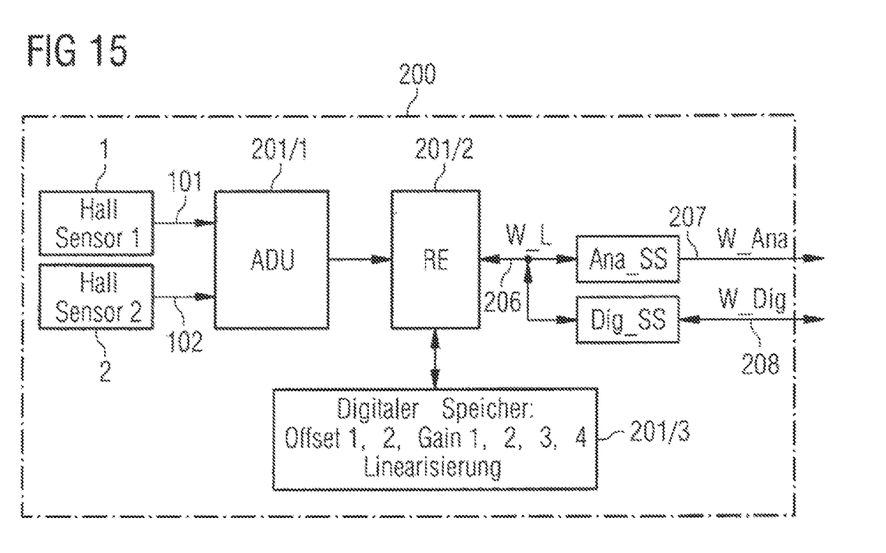
FIG. 15 shows a digital block diagram of the signal processing.

In one advantageous embodiment, as shown in FIG. 15, the signal processing can be carried out digitally. The signals 101, 102 generated by the magneto sensitive sensors 1, 2 are immediately converted into a digital signal waveform using an analog/digital converter 201/1 and the signal processing steps described in block 100 of FIG. 14 are carried out in a digital computing unit. The required parameters for gain, offset, zero point and linearization can be stored in a digital memory.

Figure 21:
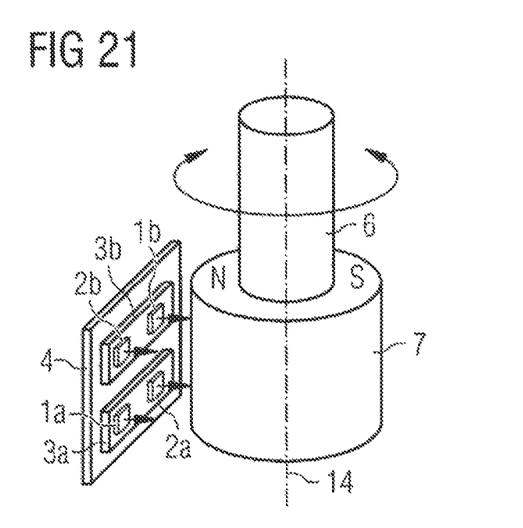
FIG. 21 shows an arrangement for redundantly measuring a rotational position with a radial structure for off-axis applications.

FIG. 21 shows an embodiment of the apparatus for redundantly measuring a rotational position with a radial structure for off-axis applications. An object 6 which is rotatably mounted around an axis of rotation 14 contains a magnetic field source in the form of a disk magnet 7 with two-pole diametric magnetization which is connected to the object and the radial field of which is measured and evaluated using two sensor elements 3a, 3b.

The axes of the integrated Hall sensors, which axes are sensitive to the measurement of the magnetic fields, are illustrated in the form of arrows.

An absolute change in the magnetic field strength, as occurs when the temperature of the magnet changes for example, does not influence the accuracy of the measurement principle since the measured signals are evaluated ratiometrically and changes in the signal amplitude are therefore compensated for, provided that they act equally on all Hall sensors.

In the case of FIG. 21, this also applies if the rotatable element 6 with the magnetic field source fitted thereto is displaced in the axial direction. The axial displacement may produce different signal amplitudes in the four magneto sensitive sensors in the form of Hall sensors, but this signal change has the same effect on all Hall sensors and is therefore compensated for.

The advantage of this embodiment is, in particular, a high tolerance with respect to axial displacements of the rotatably mounted parts 6, 7.

Furthermore, this embodiment is also suitable for ring magnets and hollow shafts since the magnetic field of the magnetic field source is measured on the circumference thereof.

Figure 22:
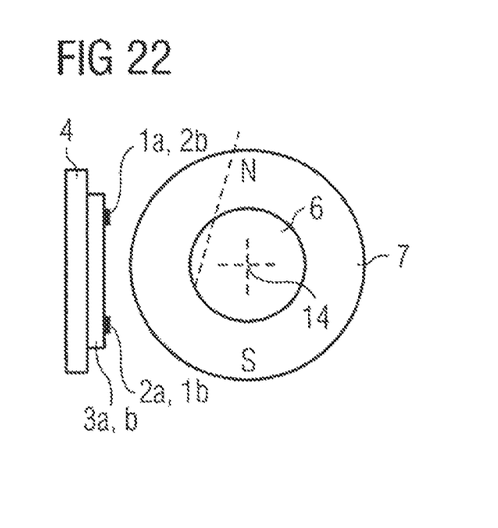
FIG. 22 shows a plan view of FIG. 21.

FIG. 22 shows a plan view of FIG. 21. There is no need to exactly center the sensor elements 3a, 3b with respect to the axis of rotation 14 since these tolerances can be compensated for by a reference run after the sensor system has been assembled.

Figure 23:
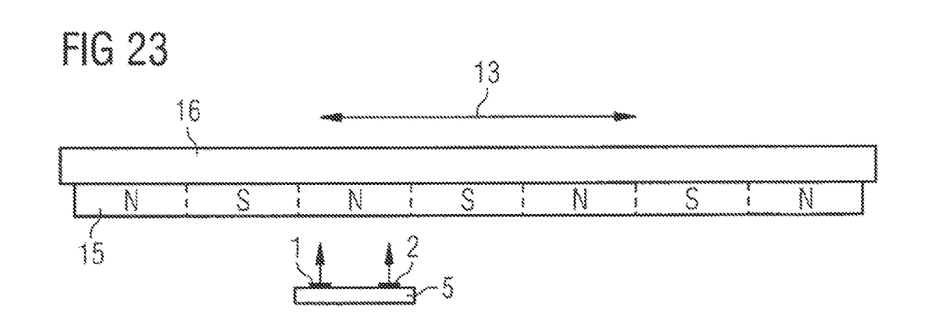
FIG. 23 shows a non-redundant arrangement with a linearly movable element.

FIG. 23 shows an arrangement having a linearly movable element. A multi-pole magnetic strip 15 is fitted on an element 16 which is linearly moved along an axis 13, the field Bz of said magnetic strip, which is normal to the direction of movement, being measured by two magneto sensitive sensors in the form of Hall sensors 1, 2 which are fitted below the magnetic strip 15. The axes of the Hall sensors 1, 2 integrated on a common substrate 5, which axes are sensitive to the measurement of the magnetic field, are illustrated as arrows.

The magnetic field measured by the Hall sensors 1, 2 during movement of the magnetic strip 15 has a sinusoidal profile, the signals 101, 102 measured by the Hall sensors having a phase offset with respect to one another. The length of the poles of the magnet can be varied in a wide range, but it must be ensured that the phase offset of the two sensor signals is not 180° and is not 360°. A phase offset of 180° is produced if the distance between the Hall sensors in the direction of movement is equal to the length of one pole of the magnetic strip. A phase offset of 360° is produced if the distance between the Hall sensors in the direction of movement is equal to the length of one pole pair of the magnetic strip or an integer multiple thereof.

Figure 24:
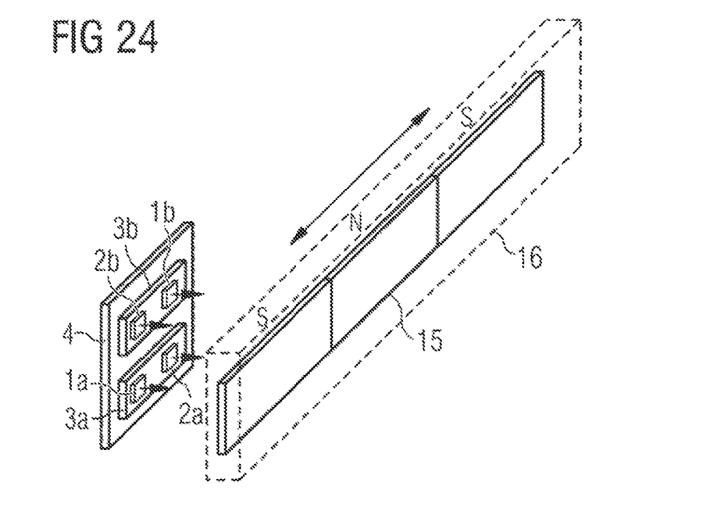
FIG. 24 shows the arrangement from FIG. 3 in a redundant design for redundant position determination.

FIG. 24 shows the sensor system having a multi-pole magnetic strip 15 for redundantly determining the position of a linearly moved object 16. An absolute linear position can be determined over a length corresponding to the length of one pole pair. The length of the pole pairs of the magnetic field source in the form of a multi-pole magnetic strip 18 and the distance between the magnetosensitive sensors in the direction of movement should be selected in such a manner that the resulting phase offset is not 180° and is not 360°.

The same method as that used to determine the absolute rotational position, as described in the above table, is used to determine the absolute linear position.

The invention was explained in more detail using examples and figures, in which case this description is not intended to restrict the invention. It goes without saying that experts can make changes and modifications without departing from the scope of the following claims. In particular, the invention comprises embodiments with any combination of features of the different embodiments described here.

LIST OF REFERENCE SYMBOLS

1 First magnetosensitive sensor
1a First magnetosensitive sensor of the first sensor element
1b First magnetosensitive sensor of the second sensor element
2 Second magnetosensitive sensor
2a Second magnetosensitive sensor of the first sensor element
2b Second magnetosensitive sensor of the second sensor element
3 Sensor element comprising two magnetosensitive sensors
3a First sensor element
3b Second sensor element
2 Second magnetosensitive sensor
4 Common housing
5 Common substrate
6 Rotatable element
7 Disk magnet with two-pole diametric magnetization
8 Disk magnet with multi-pole magnetization
9 Ring magnet with two-pole diametric magnetization
10 Ring magnet with multi-pole magnetization
13 Axis
14 Axis of rotation 15 Multi-pole magnetic strip
16 Linearly movable element
101 First sensor signal
102 Second sensor signal
103 First offset
104 Second offset
105 First gain
106 Second gain
107 First normalized sensor signal
108 Second normalized sensor signal
109 Sum signal
110 Difference signal
111 Third gain
112 Fourth gain
113 Normalized sum signal
114 Normalized difference signal
202 Absolute rotational position
203 Magnitude value B of the coordinate transformation
207 Analog signal waveform
208 Digital signal waveform
100 Analog signal processing block
200 Digital signal processing block

The invention claimed is:

1. An apparatus for contactlessly detecting the absolute position of an element which is movable relative to magnetosensitive sensors and has a magnetic field source fastened on the movable element, two magnetosensitive sensors which are in one plane and are spatially offset in the direction of movement being arranged at a distance from the magnetic field source in such a manner that a first sensor signal can be measured using the first magnetosensitive sensor and a second sensor signal can be measured using the second magnetosensitive sensor, the first sensor signal and the second sensor signal representing a component of the magnetic field and the sensor signals having a phase offset φ in the range of 0°<φ<180° or 180°<φ<360°,
wherein the apparatus has a redundant design such that it has two sensor elements, two such magnetosensitive sensors being arranged in each sensor element, and the magnetosensitive sensors and the sensor elements being integrated together on a sensor chip,
the apparatus further comprising evaluation electronics configured to calculate an absolute position of the magnetic field source using a normalized sum signal and a normalized difference signal, wherein the absolute position for the sensor signals from each sensor element is redundantly determined.

2. The apparatus as claimed in claim 1, wherein the movable element is rotatably mounted, in that the plane is arranged parallel to the axis of rotation, and in that the two sensor elements are accommodated in a common housing which is fitted in a stationary manner to the side of the magnetic field source parallel to the axis of rotation, which sensor elements each comprise two magnetosensitive sensors and, which are in one plane and are spatially offset in the direction of rotational movement, with the associated evaluation electronics and detect and evaluate the radial component of the magnetic field.

3. The apparatus as claimed in claim 2, wherein the movable element is rotatably mounted, in that the plane is arranged normal to the axis of rotation, and in that the two sensor elements are accommodated in a common housing which is fitted in a stationary manner parallel to the plane, which sensor elements each comprise two magnetosensitive sensors and, which are in one plane and are spatially offset in the direction of rotational movement, with the associated evaluation electronics and detect and evaluate the axial component of the magnetic field.

4. The apparatus as claimed in claim 3, wherein the magnetosensitive sensors are arranged equidistantly and symmetrically around the axis of rotation in the common housing.

5. The apparatus as claimed in claim 3, wherein the two sensor elements are in the same plane.

6. The apparatus as claimed in claim 2, wherein the absolute rotational position is detected over an angular range of 360°, the magnetic field source being in the form of a disk magnet or a ring magnet with two-pole diametric magnetization.

7. The apparatus as claimed in claim 2, wherein the absolute rotational position is detected over an angular range of <360°, the magnetic field source being in the form of a disk magnet or a ring magnet with multi-pole magnetization.

8. The apparatus as claimed in claim 1, wherein the element which is movable relatively is linearly displaceable, a magnetic field source which is in the form of a multi-pole magnetic strip and has poles of equal length being fastened on the element which is movable relatively, in that the magnetosensitive sensors detect the magnetic component normal to the direction of movement, in which case the distance between the two magnetosensitive sensors of a sensor element, the length of the magnet poles and the position of the magnetosensitive sensors relative to the magnetic field source should be selected in such a manner that the resulting phase offset of the sensor signals from each sensor element is not 180° and is not 360°.

9. The apparatus as claimed in claim 8, wherein two sensor elements are accommodated in a common housing which is fitted in a stationary manner at a distance from the magnetic field source parallel to the direction of movement, which sensor elements each comprise two magnetosensitive sensors and, which are in one plane and are spatially offset in the direction of movement, with the associated evaluation electronics and detect and evaluate a component of the magnetic field, the range which can be immediately measured in absolute terms corresponding to the length of a pole pair of the magnetic field source.

10. The apparatus as claimed in claim 1, wherein the evaluation electronics are further configured to:
determine amplitude ratios by dividing a predefinable signal swing by a difference between a maximum value and a minimum value of the respective sensor signals,
determine offset values around the respective zero point of the sensor signals from the minimum and maximum values of the sensor signals,
calculate normalized sensor signals by subtracting the offset values from the sensor signals and by normalization with the amplitude ratios, the minimum and maximum values being determined by a relative movement of the element and the magnetic field source fastened thereto over a complete movement path while simultaneously detecting the sensor signals from both sensors,
form a sum signal and a difference signal from the normalized sensor signals,
normalize in turn the sum signal and the difference signal after the amplitude ratio is determined, the minimum and maximum values being determined by a relative movement of the element and the magnetic field source fastened thereto over a complete movement path while simultaneously measuring the sum signal and the difference signal and evaluating the minimum and maximum values of the sum signal and of the difference signal.

11. The apparatus as claimed in claim 1, wherein the sensor elements and the respective magnetosensitive sensors of each of the sensor elements are arranged with respect to the magnetic field source so that the component of the magnetic field represented by the first and second sensor signals of the magnetosensitive sensors of one of the sensor elements is the same component of the magnetic field represented by the first and second sensor signals of the magnetosensitive sensors of the other of the sensor elements.

12. The apparatus as claimed in claim 1, wherein each of the sensor elements further comprises respectively integrated signal processing electronics.

13. A method for determining the absolute position of an element which is movable relative to magnetosensitive sensors using an apparatus for contactlessly detecting an element which is movable relatively and has a magnetic field source fastened on the movable element, a first sensor element and a second sensor element being arranged at a distance from the magnetic field source, two magnetosensitive sensors which are spatially offset in the direction of movement being arranged in each sensor element, provision being made for a first sensor signal to be measured using the first magnetosensitive sensor of each sensor element and for a second sensor signal to be measured using the second magnetosensitive sensor of each sensor element, the first sensor signal and the second sensor signal representing a component of the magnetic field, and the sensor signals having a phase offset φ in the range of 0°<φ<180° or 180°<φ<360°, provision being made for amplitude ratios to be determined by dividing a predefinable signal swing by a difference between a maximum value and a minimum value of the respective sensor signals, for offset values around the respective zero point of the sensor signals to be determined from the minimum and maximum values of the sensor signals, for normalized sensor signals to be calculated by subtracting the offset values from the sensor signals and by means of normalization with the amplitude ratios, the minimum and maximum values being determined by means of a relative movement of the element and the magnetic field source fastened thereto over a complete movement path while simultaneously detecting the sensor signals from both sensors, for a sum signal and a difference signal to be formed from the normalized sensor signals, for the sum signal and the difference signal to in turn be normalized after determining the amplitude ratio, the minimum and maximum values being determined by means of a relative movement of the element and the magnetic field source fastened thereto over a complete movement path while simultaneously measuring the sum signal and the difference signal and evaluating the minimum and maximum values of the sum signal and of the difference signal, and for an absolute position of the magnetic field source to be calculated using the normalized sum signal and the normalized difference signal, wherein the absolute position for the sensor signals from each sensor element is redundantly determined.

14. The method as claimed in claim 13, wherein the movable element is a rotatable element and an absolute rotational position of the magnetic field source is calculated.

15. The method as claimed in claim 14, wherein the absolute rotational position is calculated by forming the arc tangent of the ratio of the normalized sum signal and the normalized difference signal.

16. The method as claimed in claim 14 wherein the absolute position of the magnetic field source is calculated using a coordinate transformation algorithm, preferably a CORDIC algorithm.

17. The method as claimed in claim 13, wherein the movable element is a linearly displaceable element and an absolute linear position is determined.

18. An apparatus configured to perform the method as claimed in claim 13.

* * * * *